United States Patent [19]

Niehaus et al.

[11] Patent Number: 4,789,957

[45] Date of Patent: Dec. 6, 1988

[54] STATUS OUTPUT FOR A BIT SLICE ALU

[75] Inventors: Jeffrey A. Niehaus, Dallas; Jesse O. Englade, Plano, both of Tex.

[73] Assignee: Texas Instruments Incorporated, Dallas, Tex.

[21] Appl. No.: 845,726

[22] Filed: Mar. 28, 1986

[51] Int. Cl.4 .............................. G06F 7/38
[52] U.S. Cl. ................... 364/749
[58] Field of Search ........ 364/749, 736, 200 MS File, 364/900 MS File, 712, 716

[56] References Cited

U.S. PATENT DOCUMENTS

| | | | |
|---|---|---|---|
| 3,297,999 | 1/1967 | Shimabukuro | 340/174.5 |
| 4,032,895 | 6/1977 | Lanza et al. | 364/200 |
| 4,093,993 | 6/1978 | Sato | 364/749 |
| 4,224,676 | 9/1980 | Appelt | 364/712 |
| 4,268,908 | 5/1981 | Logue et al. | 364/200 |
| 4,393,468 | 7/1983 | New | 364/200 |
| 4,405,992 | 9/1983 | Blau et al. | 364/748 |
| 4,442,498 | 4/1984 | Rosen | 364/745 |
| 4,467,444 | 8/1984 | Harmon, Jr. et al. | 364/900 |
| 4,468,748 | 8/1984 | Blau et al. | 364/748 |
| 4,476,523 | 10/1984 | Beauchamp | 364/200 |
| 4,502,115 | 2/1985 | Eguchi | 364/200 |
| 4,528,641 | 7/1985 | Burrows | 364/749 |
| 4,541,048 | 9/1985 | Propster et al. | 364/200 |

OTHER PUBLICATIONS

"Digital System Design with LSI Bit-Slice Logic", by Glenford J. Myers, (Pub. J. Wiley and Sons, Inc.), 1980, pp. 60–62; 78, 79; and 92–96.

"32-Bit Supermini Built with Bit-Slice IC Family", by Jeff Niehaus, Electronic Design, May 12, 1983.

"Chip Set Eases Bit-Slice Design While Tackling Video-Speed Processing", by Jeff Niehaus, et al., Electronics, Oct. 20, 1983, pp. 133–138.

"Advanced Schottky 8-Bit-Slice Processor Components", Product Preview Pamphlet, Texas Instruments Incorporated, 1982.

Primary Examiner—Gary V. Harkcom
Assistant Examiner—Long Nguyen
Attorney, Agent, or Firm—Thomas R. Fitzgerald; Leo N. Heiting; Melvin Sharp

[57] ABSTRACT

A bit slice processor system includes a bit slice ALU that is cascadable to provide multiple length words. Each of the ALUs provides both command outputs and status outputs. The status outputs are interfaced with each of the package as are the command outputs. Each of the ALUs in the cascaded ALU are controlled by an instruction word to perform a predetermined processing function. Internal status information is processed to generate a command output and a status output. This command is transmitted simultaneously with the status to the remaining packages in the cascaded array to provide processing control.

12 Claims, 8 Drawing Sheets

STATUS OUTPUT FOR A BIT SLICE ALU

TECHNICAL FIELD OF THE INVENTION

The present invention pertains in general to bit slice systems, more particularly, to the status output of bit slice ALU section.

BACKGROUND OF THE INVENTION

A bit slice system provides a designer with the tools to customize a processor to the needs of a given application. The bit slice architecture utilizes a bit slice processor which is comprised of a microsequencer and an expanded bit slice arithmetic logic unit (ALU). The microsequencer is combined with a microprogram memory and a microinstruction register to provide control codes for the bit slice ALU. This type of a processor is effectively a computer for disposal within a more sophisticated computer architecture. With the bit slice system, the designer can define the details of the system operation, including the instruction set to be implemented. This allows the designer to deviate from the preset instruction set which is common to most processors.

The bit slice ALU is a fundamental part of the system. This element is designed so that it can be connected to similar elements to provide an ALU of any desired word width. Central to the ALU slice is that its operation can be expanded to any number of bits by interconnection of like ALUs. For example, if an ALU with eight bits per circuit is utilized, four circuits would form the ALU for a thirty-two bit processor. The carry and shift lines provide communication between ALUs so that multiple bit arithmetic operations can be performed.

When a number of bit slice ALUs are combined to provide an expanded word width, some functions require various status information such as overflow, zero, etc., in order to process data in a pipeline fashion especially with operations such as multiplication and division. Conventional systems utilize a Zero status output which examines all the bits in the result and outputs this status information to the remaining bit slice ALUs in a multiple bit slice ALU system. The zero output is a status signal providing status from one bit slice ALU to another. However, there are some functions that require control commands from one bit slice ALU to another. In conventional systems, the zero output is multiplexed to provide some control information for various functions. However, present systems do not provide the capability to output both status and control signals simultaneously which, for some operations, can be a significant disadvantage.

SUMMARY OF THE INVENTION

The present invention disclosed and claimed herein comprises a expandable bit slice processor with a plurality of bit slice arithmetic logic units (ALUs). Each of the ALUs is n-bits in length and cascadable to provide a bit slice processor nXm bits in length where m is the number of the cascaded ALUs. Each ALU has a control input/output and status input/output. A bus is provided for interfacing with the status input/output and a separate bus is provided for interfacing with the control input/outputs. Status circuitry is provided for determining status information of the processed data in accordance with the processing function of the cascaded ALU and generating a status signal for transmission along the status bus. Control circuitry is provided for determining control information of the processed data and generating a control signal. The control signal is generated in accordance with a predetermined control logic function that is a function of the processing function of the cascaded ALU. The control signal is interfaced on the control bus to each of the ALUs in the cascaded ALU. This allows both status and control information to be simultaneously transmitted between ALUs in the cascaded ALUs during processing of data.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Bit Slice Processor Operation

Figure 1:
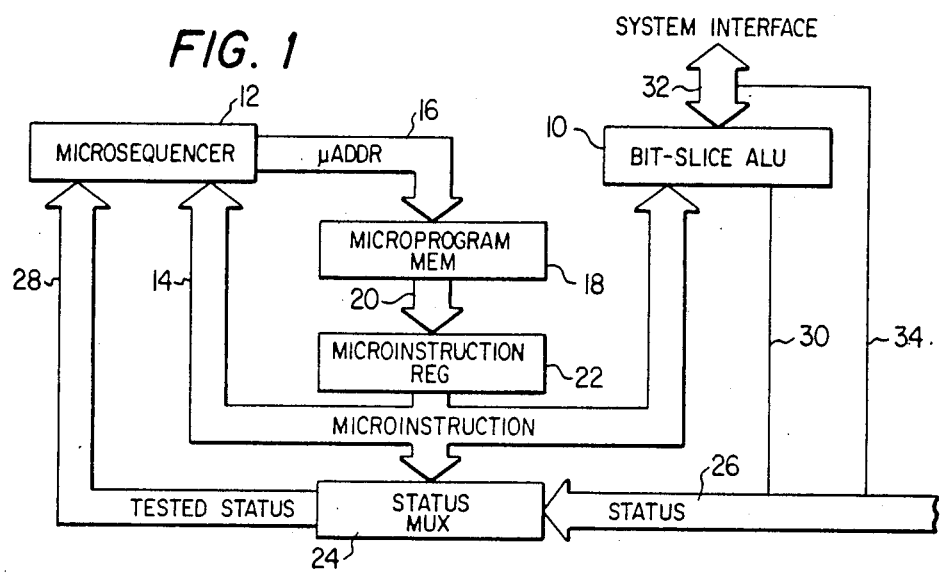
FIG. 1 illustrates a schematic block diagram of a bit slice processor.

With reference to FIG. 1, there is illustrated a schematic block diagram of a bit slice processor which is part of an overall bit slice system (not shown). The bit slice processor consists primarily of a bit slice ALU 10 and a microsequencer 12. These two elements operating in conjunction form a microprogrammed processor which operates in the background of a main memory processor program (not shown). The main program consists of the same type of macroinstructions that any processor executes. The microprogram is stored in the microsequencer 12 and is operable to control each element within the processor to determine the particular sequence of instructions that are carried out. The microprogram is primarily directed toward elemental details of each type of ALU operation, memory reference, and I/O operation on a step-by-step basis.

To fetch and execute a single macroinstruction from main memory (the task of every processor), the bit slice processor must execute two or more sequences of microinstructions from the microprogram stored in the microsequencer 12. First, it executes a sequence of microinstructions to perform the instruction fetch and decode operations. Then, it executes the appropriate sequence of microinstructions that will implement the macroinstruction.

The microsequencer 12 and bit slice ALU 10 are interfaced with the microinstruction bus 14 which is a bidirectional bus. In addition, the microsequencer 12 outputs a microaddress on a microaddress bus 16 to a microprogram memory 18. The microprogram memory 18 has stored therein the microinstructions, which are output on a bus 20 to a microinstruction register 22 for storage therein. The microinstruction register 22 is interfaced on the output thereof with the microinstruction bus 14.

A status multiplexer 24 is provided for interfacing between the microinstruction bus 14 on one input and a status bus 26 on another input. The output of the status multiplexer 24 is a tested status bus 28 which is input to the microsequencer 12 to provide status information. The status bus 26 receives a status input from the ALU on lines 30. The bit slice ALU 10 interfaces with a system interface bus 32 which also interfaces with the status bus 26 through lines 34.

In operation, the bit slice ALU 10 is connected to the system interface bus 32 since this block performs all data and address manipulations. The status information of the bit slice ALU 10 is interfaced with the microsequencer 12 so that the microsequencer can implement any needed conditional branch or jump operations by the output of appropriate microinstructions. The control lines that define the operation of the bit slice ALU 10 must come from the microinstruction bus 14 since it defines what operation each element of the system is performing at each point in time.

The control code for the bit slice ALU 10 makes up part of the microinstruction code, or microcode for short. Another part of the microcode must define the memory and input/output operations, such as memory read, memory write, input Read and output Write, that are to occur. The number of bits that must be devoted to the ALU control code and the memory control code depends on the ALU bit slice function code length, and the number of memory input/output control signals that need to be generated. As described above, the microprogram memory 18 contains all of the microcode with the microinstruction register 22 holding the microcode for the microoperation that is currently being performed.

The microsequencer 12 determines which microinstruction is to be executed next, and must send this address to the microprogram memory 18. Normally, the next instruction is located immediately after the current instruction being executed, just as it is in the main computer program in main memory. Thus, the sequencer usually adds one to the present microaddress to get the next microaddress. In some cases, the microsequencer 12 must perform a branch or subroutine jump within the microprogram. The address for a jump to the next microinstruction to be executed must come from either the current microinstruction, or it must be an address generated as a result of the main instruction code or an interrupt condition. The branch address is generated by either a portion of the microcode and the microinstruction register 22, or it is generated by an internal interrupt vector circuit (not shown). The microsequencer 12 is therefore instructed as to whether to execute a branch, a subroutine jump, a subroutine return, or simply increment to the next microinstruction address in the microprogram memory 18.

Bit Slice ALU

Figure 2:
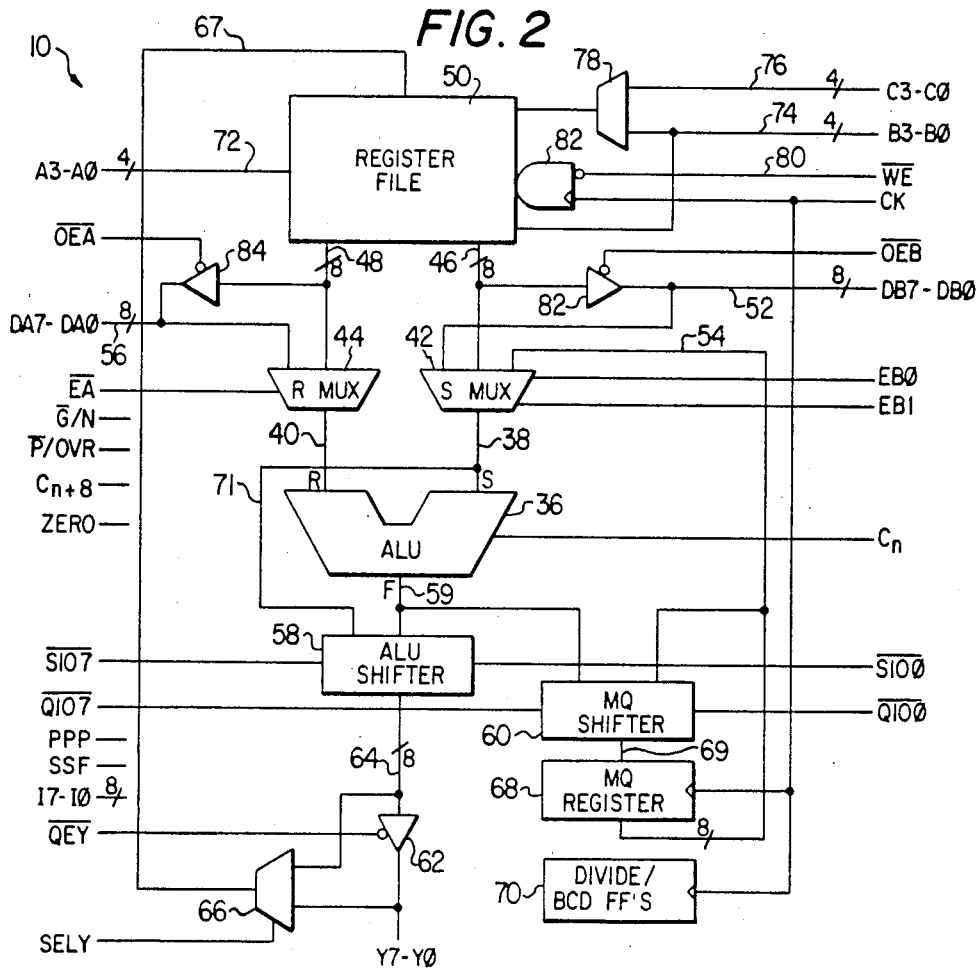
FIG. 2 illustrates a schematic block diagram of a bit slice ALU.

Referring now to FIG. 2, there is illustrated a schematic block diagram of the bit slice ALU 10. The bit slice ALU 10 includes an arithmetic logic unit (ALU) 36 which provides the processing capability of a conventional ALU. The ALU 36 has two inputs which are provided on an eight-bit wide S-bus 38 and an eight-bit wide R-bus 40. The S-bus 38 is connected to the output of a multiplexer 42 and the R-bus 40 is connected to the output of a multiplexer 44. Multiplexers 42 and 44 each have one input thereof connected to eight-bit buses 46 and 48, respectively, which are connected to two outputs from a register file 50. The multiplexer 42 has two remaining inputs, one of which is connected to an eight-bit bus 52 and the other of which is connected to an eight-bit bus 54. The multiplexer 44 has a second input which is connected to a data bus 56. Data buses 52 and 56 allow for input of two data words, each eight bits in length.

The output of the ALU 36 is connected to the input of an ALU shift circuit 58 through an output bus 59 and also to the input of a Multiply-Quotient shift circuit 60. The output of shift circuit 58 is connected to a Y-output through a gated buffer 62 through a bus 64. The bus 64 is also connected to one input of a multiplexer 66, the other input of which is connected to the output of buffer 62. The buffer 62 has the output thereof connected to the Y-output to provide an output for the bit slice ALU 10. The output of mutliplexer 66 is connected to the data input of the register file 50.

The shift circuit 60 has the output thereof connected to the input of a clocked register 68 through a bus 69, the output of which is connected to bus 54 for input to both the multiplexer 42 and also to the second input of the shifter 60. A divide flip-flop 70 is also provided for aiding in some of the processing operations of the bit slice ALU 10.

The input bus 38 on the ALU 36 has a bypass bus 71 for connecting the bus 38 with a second input on the ALU shift circuit 58. The shift circuit 58 is controlled by an external control and internal decode circuitry (not shown) to select the output of the ALU 36 or the bus 71 and shift it one place to the right, one place to the left or pass it directly therethrough. The operation of this bypass bus 71 will be described in more detail hereinbelow and comprises an important aspect of the present invention. The ALU 36 is a conventional circuit and is similar to the circuitry utilized in a device of the type 74LS181 manufactured by Texas Instruments, Inc.

Register file

The register file 50 is operable to store sixteen eight-bit words and has the capability to output two digital words or operands therefrom which are addressed by an A-address that is input on an A-address bus 72 and a B-address that is input on a B-address bus 74. The register file 50 also has the capability of being written back into through a Write address which is input on a C-address bus 76. In addition, the Write address input can be multiplexed to receive the address from the B-address bus 74 through multiplexer 78. As will be described hereinbelow, the register file 50 has a data latch for interface with the feedback bus 67 and a Write address latch for interface with the Write address output by multiplexer 78. The Write address latch is controlled by a Write Enable signal on line 80 which is input to an AND circuit 82, the AND circuit 82 being clocked by a clock signal. The register file also has the capability to output data on data buses 52 and 56 through three state enable buffers 83 and 84, respectively.

In operation, the register file 50 can provide two operands to the ALU 36 or two operands can be eternally input on the data buses 52 and 56 to the ALU 36.

The ALU output is then sent through a double precision shifter consisting of ALU shifter 58 and the MQ shifter 60. These shifters help perform bit shifts and multiplications and divisions. The output of the ALU shifter 58, which can be unshifted or shifted ALU data, can be stored back in the register file 50 through control of multiplexer 66 and/or output to the external Y-bus. In double precision (16 bit) shifts and in multiplications, partial result components are stored in the MQ register.

The bit slice ALU of FIG. 2 has additional inputs which are described in Table 1 as follows.

TABLE 1

PIN DESCRIPTIONS

| NAME | INPUT/ OUTPUT | DESCRIPTION |
|---|---|---|
| $\overline{WE}$ | Input | Register file (RF) write enable. Data is written into RF when $\overline{WE}$ is low and a low-to-high clock transition occurs. RF write is inhibited when $\overline{WE}$ is high. |
| B3–B0 | Input | Register file B port read address select. (0 = LSB) |
| $\overline{OEB}$ | Input | DB bus enable, low active. |
| DB7–DB0 | Input/Output | B port data bus. Outputs register date ($\overline{OEB}$=0) or used to input external date ($\overline{OEB}$=1). (0 = LSB) |
| Y7–Y0 | Input/Output | Y port data bus. Outputs instruction results ($\overline{OEY}$=0) or used to input external data into register file ($\overline{OEY}$ = 1). |
| $\overline{OEY}$ | Input | Y bus output enable, low active. |
| PPP | Input | Package position pin. Tri-level input used to define package significance during instruction execution. Leave open for intermediate positions, tie to $V_{CC}$ for most significant package, and tie to GND for least significant package. |
| SSF | Input/Output | Special shift function. Used to transfer required information between packages during special instruction execution. |
| ZERO | Input/Output | Device zero detection, open collector. Input during certain special instructions. |
| $\overline{P/OVR}$ | Output | ALU active low propagate/ instruction overflow for most significant package. |
| $\overline{G/N}$ | Output | ALU active low generate negative result for most significant package. |
| $C_n+8$ | Output | ALU ripple carry output |
| $\overline{SIO7}$ | Input/Output | Bidirection shift pin, low active. |
| $\overline{QIO7}$ | Input/Output | Bidirection shift pin, low active. |
| $\overline{QIO0}$ | Input/Output | Bidirectional shift pin, low active. |
| $\overline{SIO0}$ | Input/Output | Bidirectional shift pin, low active. |
| $C_n$ | Input | ALU carry input. |
| I0–I7 | Input | Instruction inputs. |
| $V_{CC2}$ | | Low voltage power supply (2 V). |
| $V_{CC1}$ | | I/O interface supply voltage (5 V). |
| $\overline{EA}$ | Input | ALU input operand select. High state selects external DA bus and low state selects register file. |
| GND | | Ground pin. |
| DA0–DA7 | Input/Output | A port data bus. Outputs register file date ($\overline{EA}$ = 0) or inputs external data ($\overline{EA}$ = 1). |

TABLE 1-continued

PIN DESCRIPTIONS

| NAME | INPUT/ OUTPUT | DESCRIPTION |
|---|---|---|
| CK | Input | Clocks all synchronous registers on positive edge. |
| C3–C0 | Input | Register file write address select. |
| A3–A0 | Input | Register file A port read address select. |
| $\overline{OEA}$ | Input | DA bus enable, low active. |
| SELY | Input | Y bus select, high active. |
| EB0, EB1 | Input | ALU input operand selects. These inputs select the source of data that the S-multiplexer provides for the S-bus. Independent control of the DB bus and data path selection allow the user to isolate the DB bus while the R-ALU continues to process data. |
| Gnd | | Ground Pin |

Parallel Processing

Figure 3:
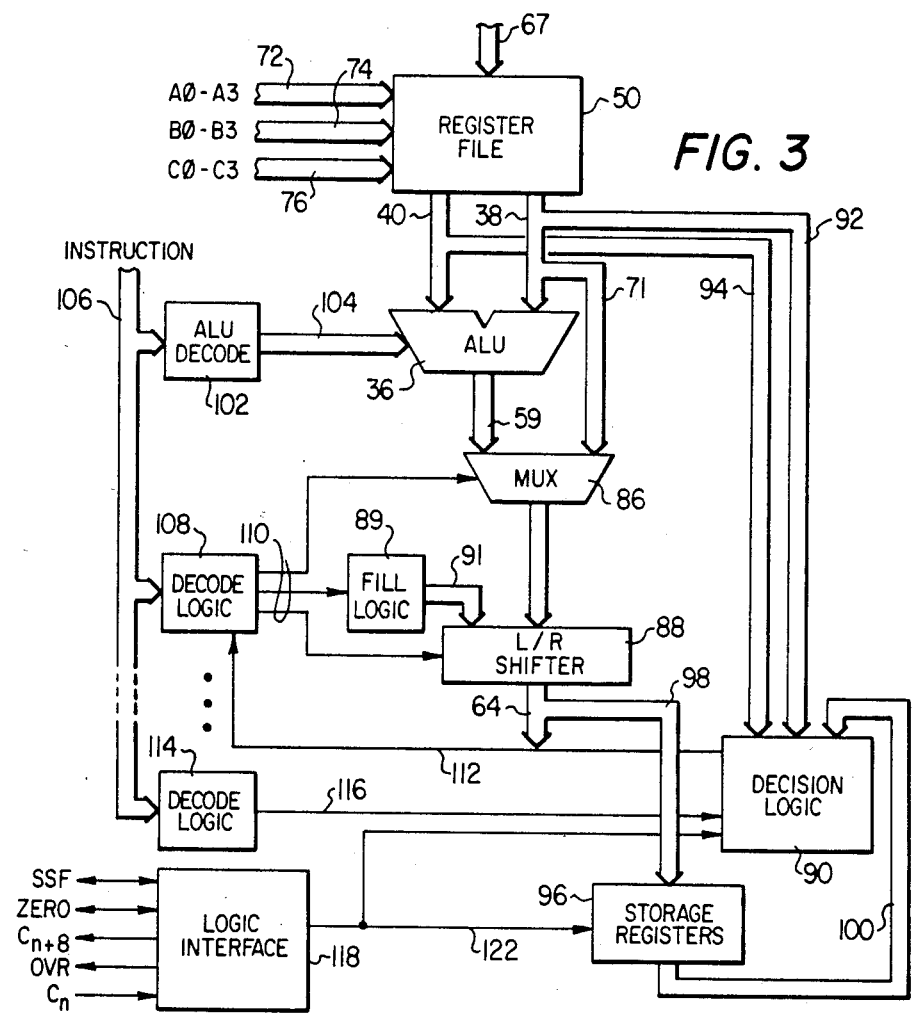
FIG. 3 illustrates a schematic block diagram of the ALU and the bypass path for increasing processing speed.

Referring now to FIG. 3, there is illustrated a schematic block diagram of the ALU 36, the ALU shifter 58 and the bypass bus 71 with associated circuitry to more clearly illustrate the operation of the ALU 36. The ALU shifter 58 is comprised of a multiplexer 86 which has a first input for receiving the output of the ALU 36 through the bus 59 and a second input for receiving the output of the bypass bus 71. The output of multiplexer 86 is input to an L/R shifter 88 which is operable to shift left by one bit, right by one bit or to pass the data directly therethrough. The output of the L/R shifter 88 is connected to the bus 64. The multiplexer 86 receives fill logic from a fill logic circuit 89 through a shift fill bus 91 to provide fill bits for the shift operation.

A decision logic block 90 is illustrated which is comprised of various decision logic for generating status and control signals for feedback information. The decision logic block 90 receives the input data from the bus 38 through a connecting bus 92 and the input information from the bus 43 through connecting bus 94. Storage registers 96 are provided which are connected to the output bus 64 through a connecting bus 98 for storage of information from a previous processing cycle. These storage registers 96 are comprised of the divide flip-flop 70 and the MQ register 68. Although the storage registers 98 are illustrated as being connected to the output bus 64, the connecting bus 98 can also be connected directly to the output bus 59 from the ALU 36. The output of the storage registers 96 are input to the decision logic block 90 through a connecting bus 100.

The decision logic block 90 is operable to determine the status of all the information stored in the storage registers 96 or the status of the operands input to the ALU on buses 40 and 38. This information is utilized to determine whether the operands for the particular processing operation are to be passed through the ALU and processed thereby or are to be passed through the bypass bus 71, the multiplexer 86 controlled to select the appropriate path. The decision logic block 90 performs certain operations on the operands depending upon the particular processing operation. For example, the input operands may be processed by an exclusive OR function or the output of the ALU and one of the input operands may be processed by an exclusive OR function. The result sets the signal on the feedback bus to either a logic high or a logic low.

The ALU 36 is controlled by an ALU decode circuit 102 which is connected to the ALU by a control bus 104. The ALU decode circuit 102 receives an instruction from an instruction bus 106 which is interfaced with the instruction input I0-I7. In a similar manner, the multiplexer 86 and the multiplexer 88 are interfaced with a decode logic circuit 108 through control lines 110. The control lines 110 also control the fill logic circuit 89. The decode logic circuit 108 receives feedback information from the decision logic circuit 90 through a feedback control line 112. The decision logic circuit 90 is interfaced with a decode logic circuit 114 through a control line 116 and also with the status input through logic interface circuit 118. The logic interface circuit 118 is operable to receive the status information from the status pins on a bus 120 and is connected to the decision logic block 90 through a control line 122. The line 122 is also connected to the storage registers 96.

In operation, certain processing operations require information regarding the operands output by the register file 50 before it can be determined whether the data is to be processed by the ALU or the data is to be passed through the bypass bus 71 to the multiplexer 86. For example, if the absolute value of an operand is desired, it is necessary to first determine the magnitude of the sign bit and then to either directly output the data, if a positive sign bit is present, or process the data through the ALU 36 to provide the two's complement of that data, if the sign bit is negative. With the processing configuration of the present invention, the ALU 36 can be configured to provide the two's complement of the data and the decision logic 90 can determine the path of the data through control of multiplexer 86. Therefore, the maximum delay would be the time required to determine the magnitude of the sign bit and the time to feedback this information to the decode logic circuit 108 and select the appropriate bus 59 or 71. If the processing time for the ALU 36 to provide the two's complement was greater than the sum of the status determination time, that would be the limiting factor. This is a parallel operation where the ALU 36 is initially controlled by the instruction on bus 106 which sets the ALU in a mode that processes the data to provide the two's complement. Therefore, the ALU 36 is processing the data simultaneous with the status determination of the magnitude of the sign bit in decision logic block 90. This significantly increases the processing speed of the bit slice ALU in that the magnitude of the sign bit does not have to first be determined and then the ALU 36 controlled to process data after the decision is made.

In prior systems, there was no bypass path 71 available. This required the status of the data to be determined prior to setting the processing mode in the ALU 36. In the absolute value example described above, this would require first determining the magnitude of the sign bit and then controlling the ALU to either provide the two's complement or pass the data therethrough. Therefore, the processing time for the absolute value operation would be the sum of the delay time through the decision logic block 90, the feedback time to alter the ALU decode logic to change the mode to the correct mode in the ALU and the processing time of the ALU. This in effect would connect the control feedback line 112 in FIG. 3 of the decision block 90 directly to the ALU decode circuit 102. In the present invention, the ALU 36 can be set in one mode and process data during the time that the decision is being made by the decision logic block 90 with the only delay thereafter being the time required to select either the bypass bus 71 or the output of the ALU 36. This selection time is significantly faster than altering modes in the ALU 36, thus resulting in significantly increased speed for certain functions. Of course, it should be understood that there are functions provided by the ALU which realize no increase of speed with the bypass bus 71.

ALU Multiplexer

Figure 4:
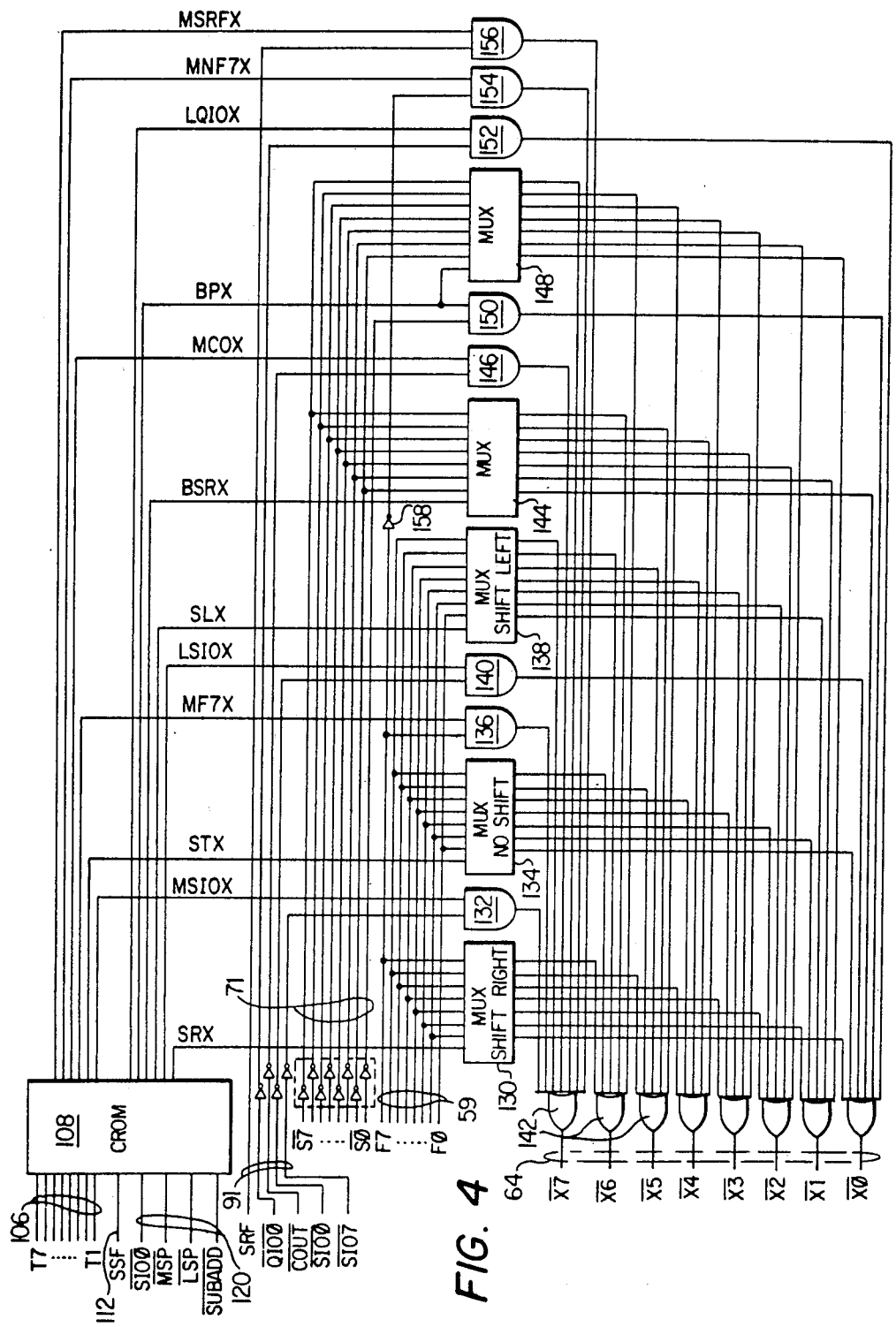
FIG. 4 illustrates a schematic block diagram of the multiplexer and L/R shifter.

Referring now to FIG. 4, there is illustrated a schematic block diagram of the multiplexer 86 and the L/R shifter 88 of FIG. 3, wherein like numerals refer to like parts in the various Figures. The decode logic 108 is represented by a control read only memory (CROM) which receives on its input both instructions from the instruction bus 108 which consists of an eight-bit word and also status information on a status bus 120 and also the feedback line 112 from the decision logic block 90. The multiplexer 86 is configured as a group of AND logic gates having the inputs thereof interfaced with both the output bus 59 from the ALU 36 and the bypass bus 71, and also with the output from the CROM 108. The bus 59 provides an eight-bit output F0-F7 and bus 71 provides an eight-bit output $\overline{S0}$-$\overline{S7}$.

The AND gates in multiplexer 86 are configured to provide a shift to the right, a shift to the left and a non-shift condition. Additional logic is provided to fill in the vacant bits. In a similar manner, AND gates are provided to provide a shift right, a shift left and a no shift condition for the information on the bypass bus 71.

A seven-input multiplexer circuit 130 has six inputs interfaced with the second through eighth bits F1-F7 of the bus 59 with the control input thereof connected to the SRX output of CROM 108. The multiplexer 130 provides a shift right function and is controlled by the SRX output. To provide the fill bit for the shift right function, an AND gate 132 is provided having one input connected to the bus 91 and the other input thereof connected to the output of the CROM 108 to the MSIOX line. A multiplexer circuit 134 is provided having seven inputs connected to the F0-F6 lines to provide a pass-through function with the control line thereof connected to the STX output of CROM 108. The bit $\overline{S7}$ of the bus 59 is selected with an AND gate 136 with the other input thereof connected to the MF7X output of the CROM 108.

A seven-input multiplexer circuit 138 is provided with the seven inputs thereof connected to the bits F0-F6, respectively, of bus 59 and the control input thereof connected to the SLX output of CROM 108 to provide a shift left function. The fill bit for the shift left operation is provided by an AND gate 140 which has one input thereof connected to the shift fill bus 91 and the other input thereof connected to the LSIOX output of the CROM 108.

The seven outputs of the multiplexer 130 are connected to the input of one of eight six-input OR circuits 142, each interfaced with one of the eight output lines $\overline{X0}$-$\overline{X7}$ of the bus 64. The multiplexer 130 has its outputs connected such that the input lines F1-F7 are connected with the OR circuits 140 to associate it with output lines $\overline{X0}$-$\overline{X6}$. The output of AND gate 132 is connected to the input of OR gate 140 to associate it with the $\overline{X7}$ line to provide a fill bit. The multiplexer 134 has the outputs thereof interfaced with the OR circuits 140 such that the lines F0-F6 are interfaced with OR circuits 140 to associate it with lines $\overline{X0}$–$\overline{X6}$, respectively, and the AND gate 136 has the output thereof input to the OR gate 140 associated with the $\overline{X7}$ line. The multiplexer 138 has the outputs thereof interfaced with the OR circuit 140 such that the input lines F0–F6 are interfaced with the OR circuit 140 associated with the output lines $\overline{X1}$–$\overline{X7}$ and the AND gate 140 has its output thereof connected to the OR gate 140 associate with the $\overline{X0}$ line to provide a fill bit for the least significant bit. Therefore, the multiplexers 130, 134 and 138 and the associated AND gates 132, 136 and 140 provide for a shift right, a shift left and a pass configuration, respectively.

A seven input multiplexer 144 has the inputs thereof interfaced with lines $\overline{S1}$–$\overline{S7}$ of the bypass bus 71 and the control input thereof connected to the BSRX output of the CROM 108 to provide a shift right function. The output of multiplexer 144 is interfaced with OR circuits 142 such that the lines $\overline{S1}$–$\overline{S7}$ are interfaced with lines $\overline{X0}$–$\overline{X6}$, respectively. An AND circuit 146 is provided for fill logic and has one input thereof connected to the fill logic bus 91 and the other input thereof connected to the MCOX control line from the CROM 108. The output of AND gate 146 is connected to the input of OR circuit 142 associated with the $\overline{X7}$ output line. A seven input multiplexer 148 is provided having the inputs thereof connected to lines S1–S7 and the control input thereof connected to a BPX control line from CROM 108. The outputs of multiplexer 148 corresponding to the input lines $\overline{S1}$–$\overline{S7}$ are connected to the OR circuits 140 and associated with lines $\overline{X1}$–$\overline{X7}$, respectively. An AND gate 150 is provided having one input thereof connected to the $\overline{S0}$ line of bus 71 and the other input thereof connected to the BPX control line. The output AND gate 150 is connected to the input of OR circuit 140 to associate it with the $\overline{X0}$ output line. Multiplexer circuit 148 and AND gate 150 provide a straight through path for the bus 71.

Additional AND gates 152, 154 and 156 are provided for additional fill logic functions. The AND gate 152 has one input thereof connected to the fill logic bus 91, the other input thereof connected to the LQIOX output of the CROM 108 and the output thereof connected to the OR circuit 142 associated with the $\overline{X0}$ line. The AND gate 154 has one input thereof connected to the F7 line of the bus 59 through an inverter 158, the other input thereof connected to the MSRFX line from the CROM 108 and the output thereof connected to the OR circuit 140 associated with the $\overline{X7}$ line. The AND gate 156 has one input thereof connected to the fill logic bus 91 and the other input thereof connected to the MSRFX line from the CROM 108. The output of the AND gate 156 is connected to the OR gate 140 associated with the $\overline{X7}$ line.

Figure 5:
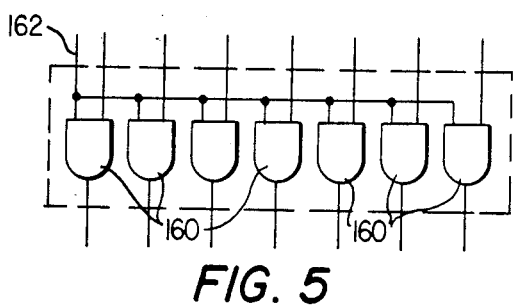
FIG. 5 illustrates a schematic diagram of the multiplexer of FIG. 4.

Referring now to FIG. 5, there is illustrated a schematic diagram of the logic for the multiplex circuits 130, 134, 138, 144 and 148. The logic circuit is configured with seven AND gates 160, each of which has one input thereof tied to a control line 162. The remaining inputs comprise seven separate input lines with the outputs thereof also being separate.

Figure 6A:
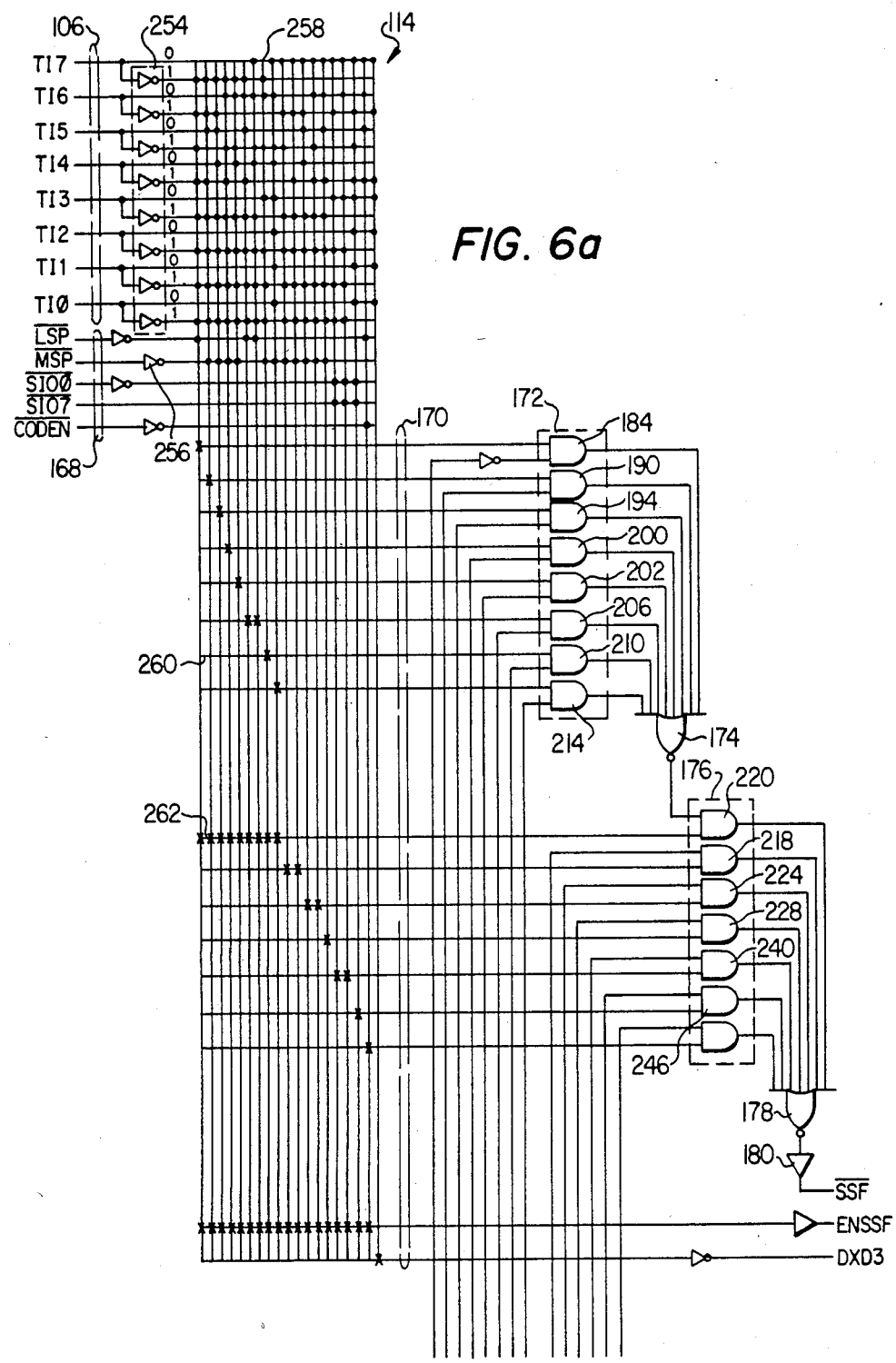
FIGS. 6a and 6b illustrate a schematic diagram of the decode logic block for determining status information on data to be processed.
Figure 6B:
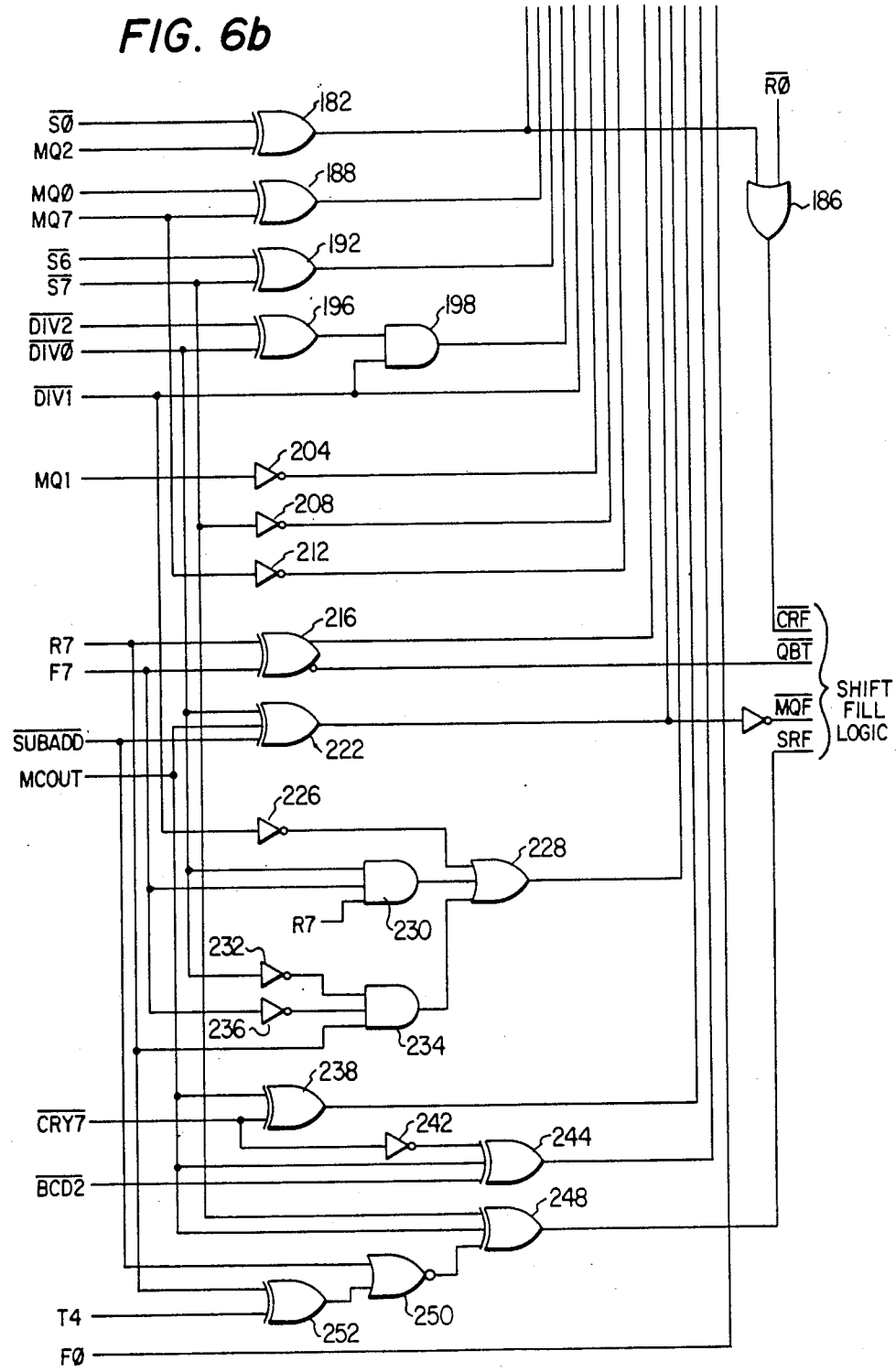

Referring now to FIG. 6, there is illustrated a schematic diagram of the decision logic block 90 and the associated decode logic 114. However, it should be understood that some of the logic in the decision logic block 90 may be contained elsewhere since it can be distributed throughout the device. The decode logic 114 is a programmable logic array (PLA) which is formed of AND and OR logic. The AND logic is represented by horizontal and vertical lines which are crisscrossed with "dots" at selected intersections representing AND functions. These dots essentially represent the inputs of a multiple input AND gate with the vertical line representing the output. The second array in decode logic 114 is represented by the vertical lines of the AND logic array intersected with horizontal lines, this array representing an OR function. The horizontal line represent the output of a single OR circuit with the input thereof represented by "X's" at the intersection of select ones of the horizontal and vertical lines. The input to the AND portion of the PLA 114 is comprised of the eight bit instruction bus 106 and additional input signals on lines 168.

The PLA 114 provides a plurality of control output lines 170 from the output of the horizontal portion of the OR array. These provide for various control functions. The first eight of these control lines are each input to one input of an AND gate in an AND gate array 172. The output of each of the AND gates in the array 172 are input to one input of an eight-input NOR gate 174. The output of NOR gate 174 is input to one input of one of seven AND gates in an AND gate array 176. The other input of the AND gate associated with the NOR gate 174 is connected to one of the output control lines from the PLA 114. The output of each of the AND gates 176 in the AND array 176 are each input to one input of a seven input NOR gate 178. The output of NOR gate 178 comprises the inverted SSF signal which is input to the line 112 through a buffer 180. This is essentially the feedback signal from the decision logic block 90 of FIG. 3.

Various input signals are provided to the decode logic block 90. These are the $\overline{S0}$–$\overline{S7}$ outputs from the bypass bus 71, the R0–R7 outputs from the connecting bus 40 which are received on bus 94, the output from the storage registers 96 which are referred to as the MQ0–MQ7 outputs corresponding to the multiply-quotient register 68 and the divide flip-flops 70. The S0 bit from bus 92 and the MQ2 bit from bus 160 are input to the two inputs of an exclusive OR gate 182, the output of which is connected to a NAND gate 184 in array 172. Additionally, the output of the exclusive NOR circuit 182 is input to one input of an OR gate 186, the other input of which is connected to the R0 signal and the output of which provides the shift fill logic signal $\overline{CRF}$.

The MQ0 and MQ7 bits from the bus 160 are input to an exclusive OR gate 188, the output of which is connected to the other input of a NAND gate 190 in array 172. The $\overline{S0}$ and $\overline{S7}$ bits from bus 92 are input to an exclusive NOR circuit 192, the output of which is connected to the other input of a NAND gate 194 in array 172. The divide bits $\overline{DIV0}$ and $\overline{DIV2}$ from the output of the divide flip-flops 70 are input to an exclusive OR gate 196, the output of which is connected to one input of an AND gate 198. The other input of the NAND gate is connected to the $\overline{DIV1}$ signal output from the divide flip-flops 70. The output of NAND gate 198 is connected to the other input of an AND gate 200. The DIV1 signal is also input to the other input of an AND gate 202. The MQ1 input is inverted by an inverter 204 and input to the other input of an AND gate 206 in array 172. The S7 bit is inverted with an inverter 208 and input to the other input of an AND gate 210 in array 172. The MQ7 signal is inverted with an inverter 212 and input to the other input of an AND gate 214 in array 172.

The R7 and F7 bits from the R-bus 40 and the ALU output bus 59, respectively, are input to an exclusive OR gate 216, the non-inverted output of which is connected to the other input of an AND gate 218 in array 176. The output of exclusive OR 174 is connected to the other end of an AND gate 220 in array 176. The inverted output of the exclusive OR gate 216 provides the $\overline{QBT}$ signal for the shift fill logic. The $\overline{DIV0}$ bit, the ALU carry output of the MCOUT and the $\overline{SUBADD}$ bit are input to a three-input exclusive OR gate 222, the output of which is connected to the other input of an AND gate 224 in array 176. The DIV1 signal is inverted with an inverter 226 and input to one input of a three-input OR gate 228, the output of which is connected to the other input of an AND gate 228 in array 176. The $\overline{DIV0}$, F7 and R7 signals are each input to one input of a three-input AND gate 230, the output of which is connected to one of the inputs of OR gate 228. The DIV0 signal is input through an inverter 232 to one input of a three input AND gate 234, the F7 signal is inverted with an inverter 236 and input to one input of the AND gate 234, and the R7 bit is input to the remaining input of AND gate 234.

The ALU carry output of the MCOUT bit is input to one input of an exclusive OR gate 238, the other input of which is connected to the $\overline{CRY7}$ carry output of the ALU. The output of exclusive OR gate 238 is connected to the other input of an AND gate 240 in array 176.

The ALU carry output $\overline{CRY7}$ is connected through an inverter 242 to one input of a three-input exclusive OR gate 244, the other two inputs of which are connected to the ALU carry output COUT and the $\overline{BCD2}$ signal, respectively. The output of exclusive OR gate 244 is connected to the other input of a NAND gate 246 in array 176. The ALU carry output COUT and the S7 bit from the bus 92 are input to two inputs of a three-input exclusive OR gate 248, the output of which comprises the SRF signal for providing shift right fill logic to the multiplexer circuit of FIG. 4. The third input of exclusive OR gate 248 is connected to the output of a NOR gate 250, one input of which is connected to the subtract/add signal $\overline{SUBADD}$. The other input of OR gate 250 is connected to the output of an exclusive OR gate 252. The two inputs of exclusive OR gate 252 are connected to the fourth bit of the instruction word and the R7 bit of bus 94, respectively.

In operation, the $\overline{SSF}$ output from NOR gate 178 provides the control signal or feedback path to the decode logic 108 of FIG. 4. This in turn controls the multiplexer 86 and L/R shifter 88. The feedback information provided from the circuit consists the divide flip-flop, the output of the storage registers 96 and also the outputs of either the R-bus 40 or the S-bus 38, the S-bus 38 comprising information on the bypass bus 71. This information is provided to control generation of the $\overline{SSF}$ in accordance with logic in the PLA 114.

In the above example for providing the absolute value function, it is necessary to determine what the magnitude of the sign bit is on the S-bus 38. If the magnitude of the sign bit indicates a negative number, it is necessary to process the data through the ALU 36 to provide the two's complement of the data and then select the output on the bus 59 with multiplexer 86. However, if the sign bit indicates a positive number, it is only necessary to process the data around the ALU 36 through the bypass bus 71. In so doing, it is not necessary to first determine the magnitude of the sign bit and then control the ALU 36 to either process the data to provide the two's complement or pass the data directly therethrough. As described above, this provides a sufficient increase in processing speed.

In the example of the absolute value, the instruction word is comprised of "00010010" corresponding to the bits I0-I7 of the instruction word input on bus 106 to PLA 114. Each of the instruction bits is input to the array directly and in an inverted form through inverters 254. The logic states for the absolute value are illustrated on the input line 258 to the array 114. In addition, a control signal $\overline{MSP}$ which is a tri-level input used to define package significance during instruction execution, is set low, resulting in a high on the input of an inverter 256. A vertical line 258 in the AND portion of the array 114 is illustrated as having "dots" at the intersections of the selected horizontal lines. For bits I0-I2, I4, I5 and I7, the connected intersections are for the inverted forms of the word whereas for bits I3 and I6, the intersections are connected at the non-inverted inputs.

In the OR portion of the array 114, a horizontal line 260 provides an OR function at intersections having "X's" disposed thereat. This results in an output on the one input to AND gate 210 in array 172. This in effect enables AND gate 210. The other input of AND gate 210 is connected to the output of inverter 208 which has the input thereof connected to the bit S7. If $\overline{S7}$ is low, this indicates a positive number and the output of AND gate 210 goes high and the output of NOR gate 174 goes low which also forces the output of AND gate 220 low. The other input of AND gate 220 is connected to a horizontal line 262 which has an "X" at the intersection with vertical line 258, indicating an OR function. Therefore, the absolute value function results in the other input of AND gate 220 being high. Both AND gate 210 in array 172 and AND gate 220 in array 176 are "enabled" to allow the level of $\overline{SSF}$ to be determined by the status of the $\overline{S7}$ bit. The S7 bit is the most significant bit or the sign bit for the data on bus 38. This bit determines the state of the control signal $\overline{SSF}$. If the sign bit in bit $\overline{S7}$ is low, indicating a positive number, $\overline{SSF}$ is low selecting the bypass pass 71. For the other state, the ALU 36 is selected. Therefore, the circuitry of FIG. 5 provides the decision logic necessary for decision logic block 90 and also the feedback information on line 112 to the decode block 108. The decode logic circuit 108 is comprised of the information in the PLA 114 and also the logic in the arrays 172 and 176 and NOR gate 174 and 178. Although not shown, additional logic arrays are provided for both the ALU 36 and also for the multiplexer 86 and L/S shifter 88. This logic array is very similar to the array 114 in that it uses an array of AND gates and an array of OR gates.

In order to select a particular processing function for the bit slice processor of the present invention, it is only necessary to input an instruction on the instruction inputs I0-I7 to select the particular instruction. The following tables depict the instructions for the bit slice processor of the present invention. These instructions are arranged in five groups.

TABLE 2

| INSTRUCTION SET | | |
|---|---|---|
| INSTRUCTION BITS (I3-I0) HEX CODE | MNEMONIC | FUNCTION |

TABLE 2-continued
INSTRUCTION SET
GROUP 1 INSTRUCTIONS

| | | |
|---|---|---|
| 0 | | Special (Note 1) |
| 1 | ADD | $\underline{R} + S + C_n$ (Note 2) |
| 2 | SUBR | $R + \underline{S} + C_n$ (Note 2) |
| 3 | SUBS | $R + \overline{S} + C_n$ (Note 2) |
| 4 | INCS | $\underline{S} + C_n$ (Note 2) |
| 5 | INCNS | $\overline{S} + C_n$ (Note 2) |
| 6 | INCR | $\underline{R} + C_n$ (Note 2) |
| 7 | INCNR | $\overline{R} + C_n$ (Note 2) |
| 8 | | Special (Note 3) |
| 9 | XOR | R XOR S (Note 2) |
| A | AND | R AND S (Note 2) |
| B | OR | R OR S (Note 2) |
| C | NAND | R NAND S (Note 2) |
| D | NOR | $\underline{R}$ NOR S (Note 2) |
| E | ANDNR | $\overline{R}$ AND S (Note 2) |
| F | | Special (Note 4) |

| INSTRUCTION BITS (I7-I4) HEX CODE | MNEMONIC | FUNCTION |
|---|---|---|
| | GROUP 2 INSTRUCTIONS | |
| 0 | SRA | Arithmetic Right Single |
| 1 | SRAD | Arithmetic Right Double |
| 2 | SRL | Logical Right Single |
| 3 | SRLD | Logical Right Double |
| 4 | SLA | Arithmetic Left Single |
| 5 | SLAD | Arithmetic Left Double |
| 6 | SLC | Circular Left Single |
| 7 | SLCD | Circular Left Double |
| 8 | SRC | Circular Right Single |
| 9 | SRCD | Circular Right Double |
| A | MQSRA | Pass (F-Y) and Arithmetic Right MQ |
| B | MQSRL | Pass (F-Y) and Logical Right MQ |
| C | MQSLL | Pass (F-Y) and Logical Left MQ |
| D | MQSLC | Pass (F-Y) and Circular Left MQ |
| E | LOADMQ | Pass (F-Y) and Load MQ (F = MQ) |
| F | PASS | Pass (F-Y) |
| | GROUP 3 INSTRUCTIONS | |
| 0 | SET1 | Set Bit |
| 1 | SET0 | Reset Bit |
| 2 | TB1 | Test Bit (ONE) |
| 3 | TB0 | Text Bit (ZERO) |
| 4 | ABS | Absolute Value |
| 5 | SMTC | Sign Magnitude/Two's Complement |
| 6 | ADDI | Add Immediate |
| 7 | SUBI | Subtract Immediate |
| 8 | BADD | Byte Add R to S |
| 9 | BSUBS | Byte Subtract S from R |
| A | BSUBR | Byte Subtract R from S |
| B | BINCS | Byte Increment S |
| C | BINCNS | Byte Increment Negative S |
| D | BXOR | Byte XOR R and S |
| E | BAND | Byte AND R and S |
| F | BOR | Byte OR R and S |
| | GROUP 4 INSTRUCTIONS | |
| 0 | CRC | Cyclic Redundancy Character Accumulation |
| 1 | SEL | Select S/R |
| 2 | SNORM | Single Length Normalize |
| 3 | DNORM | Double Length Normalize |
| 4 | DIVRF | Divide Remainder FIX |
| 5 | SDIVQF | Signed Divide Quotient FIX |
| 6 | SMULI | Signed Multiply Iterate |
| 7 | SMULT | Signed Multiply Terminate |
| 8 | SDIVIN | Signed Divide Initialize |
| 9 | SDIVIS | Signed Divide Start |
| A | SDIVI | Signed Divide Iterate |
| B | UDIVIS | Unsigned Divide Start |
| C | UDIVI | Unsigned Divide Iterate |
| D | UMULI | Unsigned Multiply Iterate |
| E | SDIVIT | Signed Divide Terminate |
| F | UDIVIT | Unsigned Divide Terminate |

TABLE 2-continued
INSTRUCTION SET
GROUP 5 INSTRUCTIONS

| | | |
|---|---|---|
| 0 | CLR | Clear |
| 1 | CLR | Clear |
| 2 | CLR | Clear |
| 3 | CLR | Clear |
| 4 | CLR | Clear |
| 5 | CLR | Clear |
| 6 | CLR | Clear |
| 7 | BCDBIN | BCD to Binary |
| 8 | EX3BC | Excess-3 Byte Correction |
| 9 | EX3C | Excess-3 Word Correction |
| A | SDIVO | Signed Divide Overflow Check |
| B | CLR | Clear |
| C | CLR | Clear |
| D | BINEX3 | Binary to Excess-3 |
| E | CLR | Clear |
| F | NOP | No Operation |

NOTES:
1. Hex code 0 used to access Group 4 instructions.
2. Hex codes 1-7 and 9-E are used in conjunction with Group 2 shift instructions to perform arithmetic or logical functions plus a shift function in one instruction cycle.
3. Hex code 8 used to access Group 3 instructions.
4. Hex code F used to access Group 5 instructions.

TABLE 3
GROUP 1 INSTRUCTIONS

| INSTRUCTION BITS (I3-I0) HEX CODE | MNEMONIC | FUNCTION |
|---|---|---|
| 0 | | Special (Note 1) |
| 1 | ADD | $\underline{R} + S + C_n$ (Note 2) |
| 2 | SUBR | $R + \underline{S} + C_n$ (Note 2) |
| 3 | SUBS | $R + \overline{S} + C_n$ (Note 2) |
| 4 | INCS | $\underline{S} + C_n$ (Note 2) |
| 5 | INCNS | $\overline{S} + C_n$ (Note 2) |
| 6 | INCR | $\underline{R} + C_n$ (Note 2) |
| 7 | INCNR | $\overline{R} + C_n$ (Note 2) |
| 8 | | Special (Note 3) |
| 9 | XOR | R XOR S (Note 2) |
| A | AND | R AND S (Note 2) |
| B | OR | R OR S (Note 2) |
| C | NAND | R NAND S (Note 2) |
| D | NOR | $\underline{R}$ NOR S (Note 2) |
| E | ANDNR | $\overline{R}$ AND S (Note 2) |
| F | | Special (Note 4) |

NOTES:
1. Hex code 0 used to access Group 4 instructions.
2. Hex codes 1-7 and 9-E are used in conjunction with Group 2 shift instructions to perform arithmetic or logical functions plus a shift function in one instruction cycle.
3. Hex code 8 used to access Group 3 instructions.
4. Hex code F used to access Group 5 instructions.

TABLE 4
GROUP 3 INSTRUCTIONS

| INSTRUCTION BITS (I7-I4) OP CODE (HEX) | MNEMONIC | FUNCTION |
|---|---|---|
| 08 | SET1 | Set Bit |
| 18 | SET0 | Reset Bit |
| 28 | TB1 | Test Bit (One) |
| 38 | TB0 | Test Bit (Zero) |
| 48 | ABS | Absolute Value |
| 58 | SMTC | Sign Magnitude/Two's Complement |
| 68 | ADDI | Add Immediate |
| 78 | SUBI | Subtract Immediate |
| 88 | BADD | Byte Add R to S |
| 98 | BSUBS | Byte Subtract S from R |
| A8 | BSUBR | Byte Subtract R from S |
| B8 | BINCS | Byte Increment S |
| C8 | BINCNS | Byte Increment Negative S |
| D8 | BXOR | Byte XOR R and S |
| E8 | BAND | Byte AND R and S |

TABLE 4-continued

GROUP 3 INSTRUCTIONS

| INSTRUCTION BITS (I7-I4) OP CODE (HEX) | MNEMONIC | FUNCTION |
|---|---|---|
| F8 | BOR | Byte OR R and S |

TABLE 5

GROUP 4 INSTRUCTIONS

| INSTRUCTION BITS (I7-I0) OP CODE (HEX) | MNEMONIC | FUNCTION |
|---|---|---|
| 00 | CRC | Cyclic Redundancy Character Accumulation |
| 10 | SEL | Select S/R |
| 20 | SNORM | Single Length Normalize |
| 30 | DNORM | Double Length Normalize |
| 40 | DIVRF | Divide Remainder FIX |
| 50 | SDIVQF | Signed Divide Quotient FIX |
| 60 | SMULI | Signed Multiply Iterate |
| 70 | SMULT | Signed Multiply Terminate |
| 80 | SDIVIN | Signed Divide Initialize |
| 90 | SDIVIS | Signed Divide Start |
| A0 | SDIVI | Signed Divide Iterate |
| B0 | UDIVIS | Unsigned Divide Start |
| C0 | UDIVI | Unsigned Divide Iterate |
| D0 | UMULI | Unsigned Multiply Iterate |
| E0 | SDIVIT | Signed Divide Terminate |
| F0 | UDIVIT | Unsigned Divide Terminate |

TABLE 6

GROUP 5 INSTRUCTIONS

| INSTRUCTION BITS (I7-I0) OP CODE (HEX) | MNEMONIC | FUNCTION |
|---|---|---|
| 0F | CLR | Clear |
| 1F | CLR | Clear |
| 2F | CLR | Clear |
| 3F | CLR | Clear |
| 4F | CLR | Clear |
| 5F | CLR | Clear |
| 6F | CLR | Clear |
| 7F | BCDBIN | BCD to Binary |
| 8F | EX3BC | Excess-3 Byte Correction |
| 9F | EX3C | Excess-3 Word Correction |
| AF | CLR | SDIVO |
| BF | CLR | Clear |
| CF | CLR | Clear |
| DF | BINEX3 | Binary to Excess-3 |
| EF | CLR | Clear |
| FF | NOP | No Operation |

STATUS AND CONTROL OF CASCADED ALU

Figure 7:
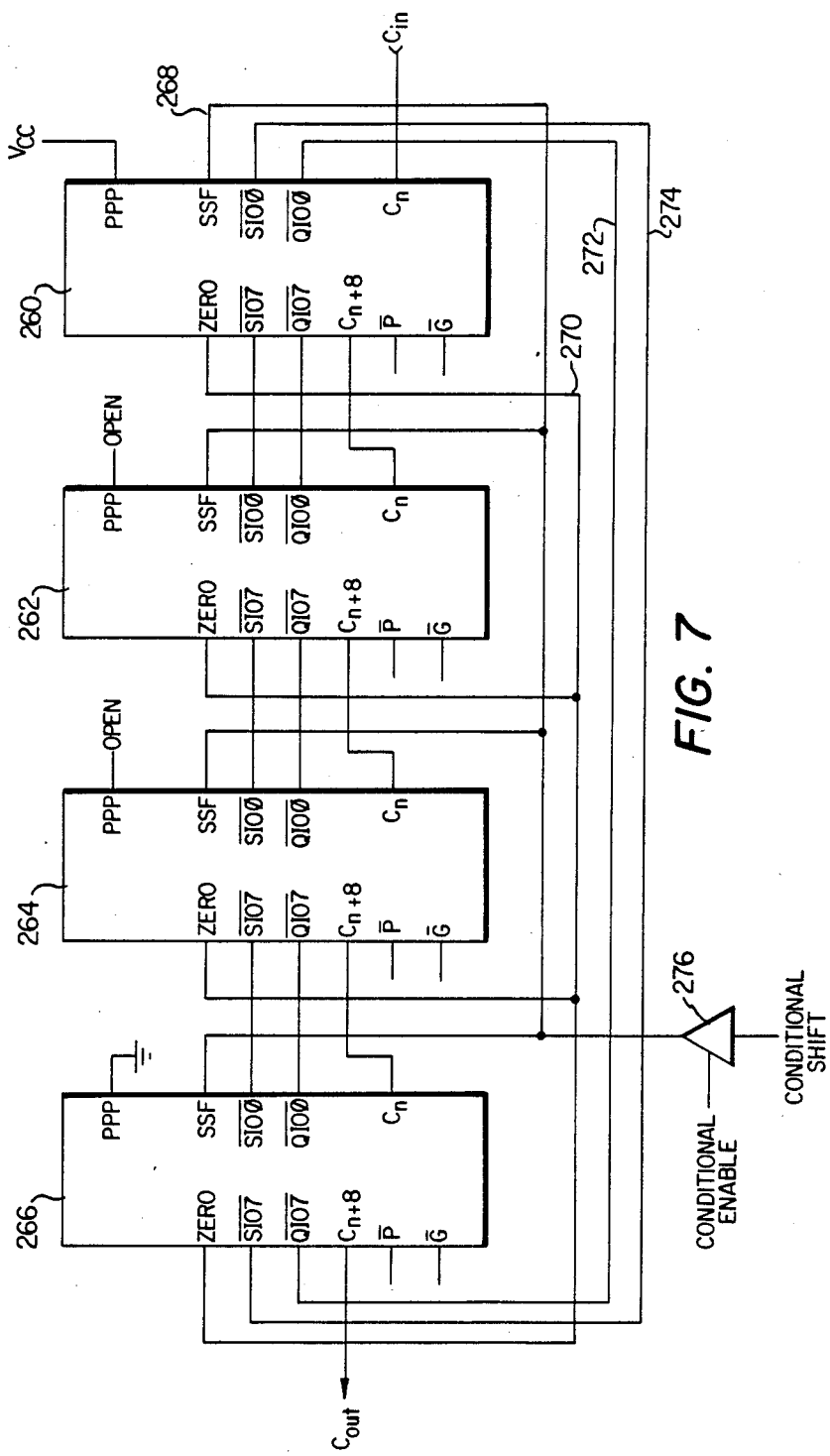
FIG. 7 illustrates a schematic diagram of a bit slice system utilizing a plurality of bit slice ALUs in increasing the word length.

Referring now to FIG. 7, there is illustrated four-bit slice ALUs 260, 262, 264 and 266, each having a width of eight bits and connected together to form a thirty-two-bit bit slice ALU. This in effect forms a thirty-two-bit high speed ALU that allows the development of a high speed thirty-two-bit processor. The bit slice ALU's 260-266 each have a special shift function (SSF) output which are connected together with a control line 268. The SSF terminal of each of the bit slice ALUs 260-266 is a bi-directional terminal. The ZERO terminal on each of the bit slice ALU'S 260-266 are connected together through a control line 270. As will be described in more detail hereinbelow, the SSF and ZERO terminals provide status and control commands at the same time during processing of data through the processor. Each of the bit slice ALU's 260, 262, 264 and 266 have a package position pin PPP to determine the position in the data word. ALU 260 is the least significant package (LSP) and PPP is connected to $V_{cc}$. ALU 266 is the most significant package (MSP) and PPP is connected to ground. ALU 262 and 264 have PPP left open.

The communication of carry and shift bits from one ALU bit slice processor to another is provided with a $C_n$, the $C_{n+8}$ and the shift bits $\overline{SIO7}$, $\overline{SIO0}$, $QIO7$ and $\overline{QIO0}$. The $C_{n+8}$ is connected to the $C_n$ of the next most significant package. In a similar manner, the $\overline{SIO7}$ and $\overline{QIO7}$ outputs from each of the bit slice ALU's 260-266 are connected to the $\overline{SIO0}$ and $\overline{QIO0}$ inputs on the next most significant package. On the most significant package 266, the $\overline{SIO7}$ and $\overline{QIO7}$ outputs are connected to the $\overline{SIO0}$ and $\overline{QIO0}$ inputs on lines 272 and 274, respectively, of bit slice ALU 260 which is at least significant bit slice ALU. A conditional shift signal is input to the control line 268 through a gate 276 which is gated by a conditional enable signal. This allows additional control of the SSF input.

The instructions that the ALU of FIG. 7 can perform include the basic arithmetic operations of addition and subtraction (with and without carry) and multiplication and division (signed and unsigned number codes). Some of these operations have byte-controlled versions and some have decimal-coded versions (BCD and X3 operations). All the basic right shift, left shift and rotation operations for bit alignment are provided, along with individual bit manipulation operations (setting, clearing, and testing).

Before performing operations, it is necessary for the user to have certain control/data signals and also certain status signals. The control/data signals are SSF, $SIO0$, $\overline{SIO7}$, $QIO0$, $\overline{QIO7}$ and $C_n$. The status signals are 0, N, OVR (overflow) and $C_{n+8}$. The primary control signal is provided by the SSF pin and, when combined with the ZERO output, both status and control signals can be communicated between individual bit slice ALUs in a multiple ALU system.

For example, in a sign magnitude/two's complement operation, data input to the ALU is converted from sign magnitude to two's complement or vice-versa. This is achieved by inverting the input data and adding the result to the $C_n$, which should be programmed high for proper conversion; the sign bit of the result is then inverted. An error condition will occur if the input word is a negative ZERO (negative sign and ZERO magnitude). In this case, a positive ZERO is generating and the overflow pin OVR is set high to reflect an illegal conversion. The sign bit of the selected operand and the most significant package is tested; if it is high, the SSF pin is pulled low and the converted number is passed to the destination operands. If the SSF is high, the operand is passed unaltered. The SSF signal from the most significant package is used as an output to all other packages to determine whether the operand is passed altered or unaltered. Therefore, the SSF pin is utilized to carry results of sign bit test for the most significant package to the remaining packages. The ZERO bit is utilized to indicate whether the result is zero or not.

In another example, the bit slice processor is utilized for cyclic redundancy character (CRC) accumulation. This operation of CRC evaluates the exclusive OR operation of two inputs to the ALU with cyclic redundancy check codes. In this operation, data on on bus is exclusive ORed with data on the other input. If the SSF pin is low, the result is sent to the ALU shifter. If SSF is high, data on the coded bus is sent to the shifter through the bypass bus 71. SSF is computed internally by the formula MQ0 (XNOR) S0, where MQ0 is the least significant bit of the MQ register, S0 is the least significant bit on the S-bus data. A right shift is then performed and the MSB is filled with with R0(MQ0 (XOR) S0), where R0 is the least significant bit of the R-bus data. A circular right shift is performed on the MQ data. Therefore, the SSF pin passes the ALU result to the shifter if it is low, or the S-bus data if it is high. As described above, this was the purpose for the bypass bus 71.

The following table 7 illustrates the various processing functions affected by the SSF output and the function provided by the SSF output.

gate 292, the other input of which is connected to the $\overline{X7}$ bit from bus 64. The output of OR gate 292 is connected to one input of a six-input NOR gate 294. A three-input OR gate 296 has the inputs thereof connected to bits $\overline{X4}$-$\overline{X6}$ of bus 64 and the output thereof connected to the input of NOR gate 294. A three-input OR gate 298 has the inputs thereof connected to bits X1-$\overline{X3}$ and the output thereof connected to the input of OR gate 294. A three-input OR gate 300 has one input thereof connected to the X0 bit of bus 64 and the remaining two inputs thereof connected to the $\overline{M0}$ and $\overline{M1}$ bits on bus 59 (inverter bank 302). The output of OR gate 300 is input to NOR gate 294. A three-input OR gate 304 has the inputs thereof connected to the $\overline{M2}$-$\overline{M4}$ bits of bus 59 through inverter bank 302 and the output thereof connected to the input of NOR gate 294. The three-input OR gate 306 has the inputs thereof connected to bits $\overline{M5}$-$\overline{M7}$ of bus 59 through inverter bank 302 and the output thereof connected to the input of

TABLE 7

| PROCESS FUNCTION | I7-I0 HEX CODE | MSP | LSP | SSF FUNCTION |
|---|---|---|---|---|
| CRC Accumulation | 0 0 | X | 1 | MQ0 (XNOR) S0 |
| Single Length Normalize | 2 0 | 1 | X | MQ7 (XOR) MQ6 |
| Double Length Normalize | 3 0 | 1 | X | S7 (XOR) S6 |
| Signed Divide Rem. Fix | 4 0 | 1 | X | DIV1 (OR) DIV0 (XNOR) DIV2 |
| Signed Divide Quo Fix | 5 0 | 1 | X | DIV1 |
| Signed Multiply | 6 0 | X | 1 | MQ1 |
| Signed Divide Initial | 8 0 | 1 | X | F7 (XNOR) R7 |
| Signed Divide Start | 9 0 | 1 | X | F7 (XNOR) R7 |
| Signed Divide Iterate | A 0 | 1 | X | F7 (XNOR) R7 |
| Unsigned Divide Start | B 0 | 1 | X | $\overline{\text{COUT}}$ (XOR) SUBADD (XOR) DIV0 |
| Unsigned Divide Iterate | C 0 | 1 | X | $\overline{\text{COUT}}$ (XOR) SUBADD (XOR) DIV0 |
| Unsigned Multiply | D 0 | X | 1 | MQ1 |
| Signed Divide Terminate | E 0 | 1 | X | DIV1 (OR) DIV0 (AND) $\overline{F7}$ (AND) $\overline{R7}$ (OR) $\overline{\text{DIV0}}$ (AND) F7 (AND) R7 |
| Absolute Value | 4 8 | 1 | X | $\overline{S7}$ |
| Sign Mag/Two's Comp. | 5 8 | 1 | X | $\overline{S7}$ |

Figure 8A:
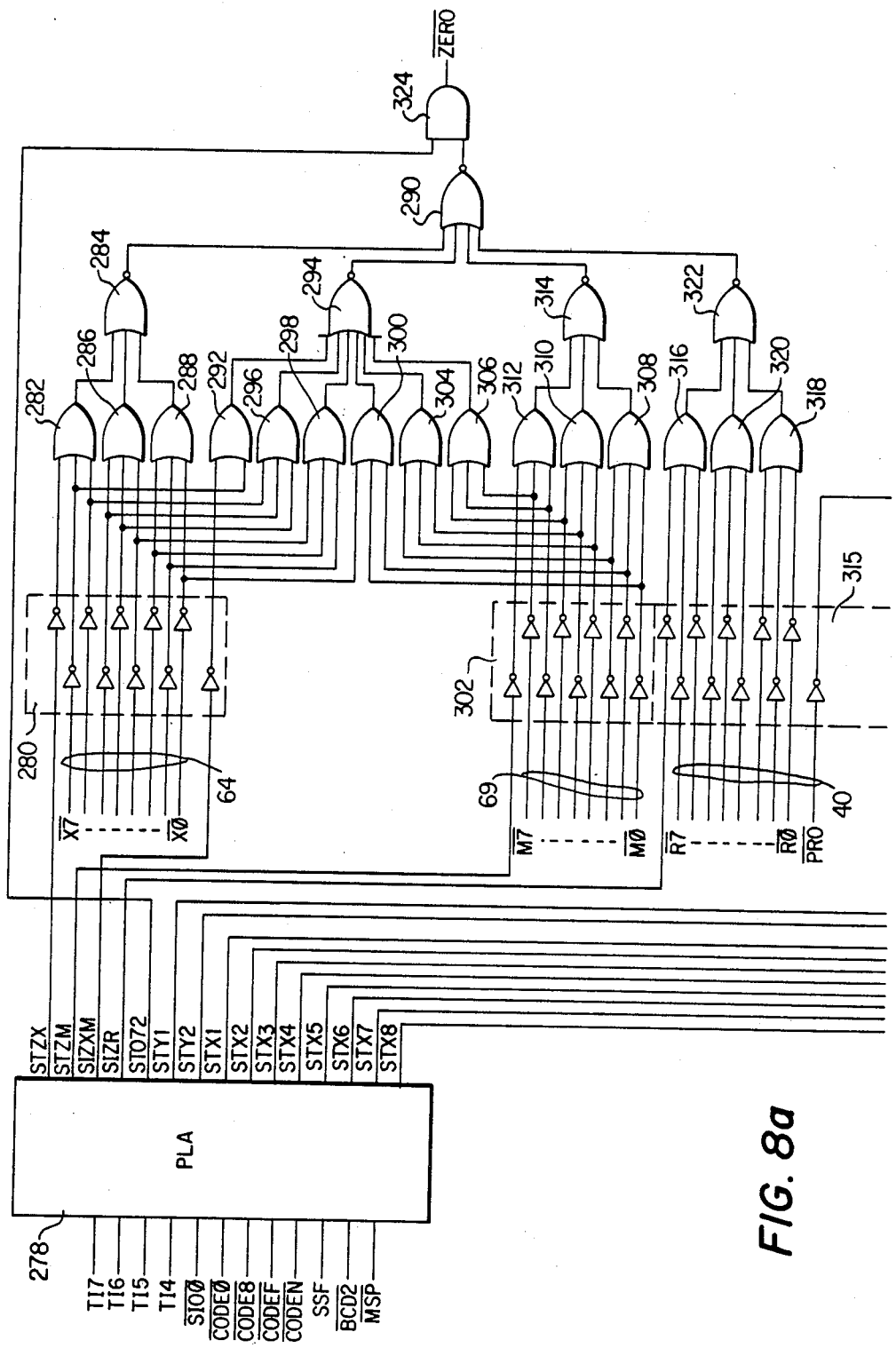
FIGS. 8a and 8b illustrate a schematic diagram of the status and control logic.
Figure 8B:
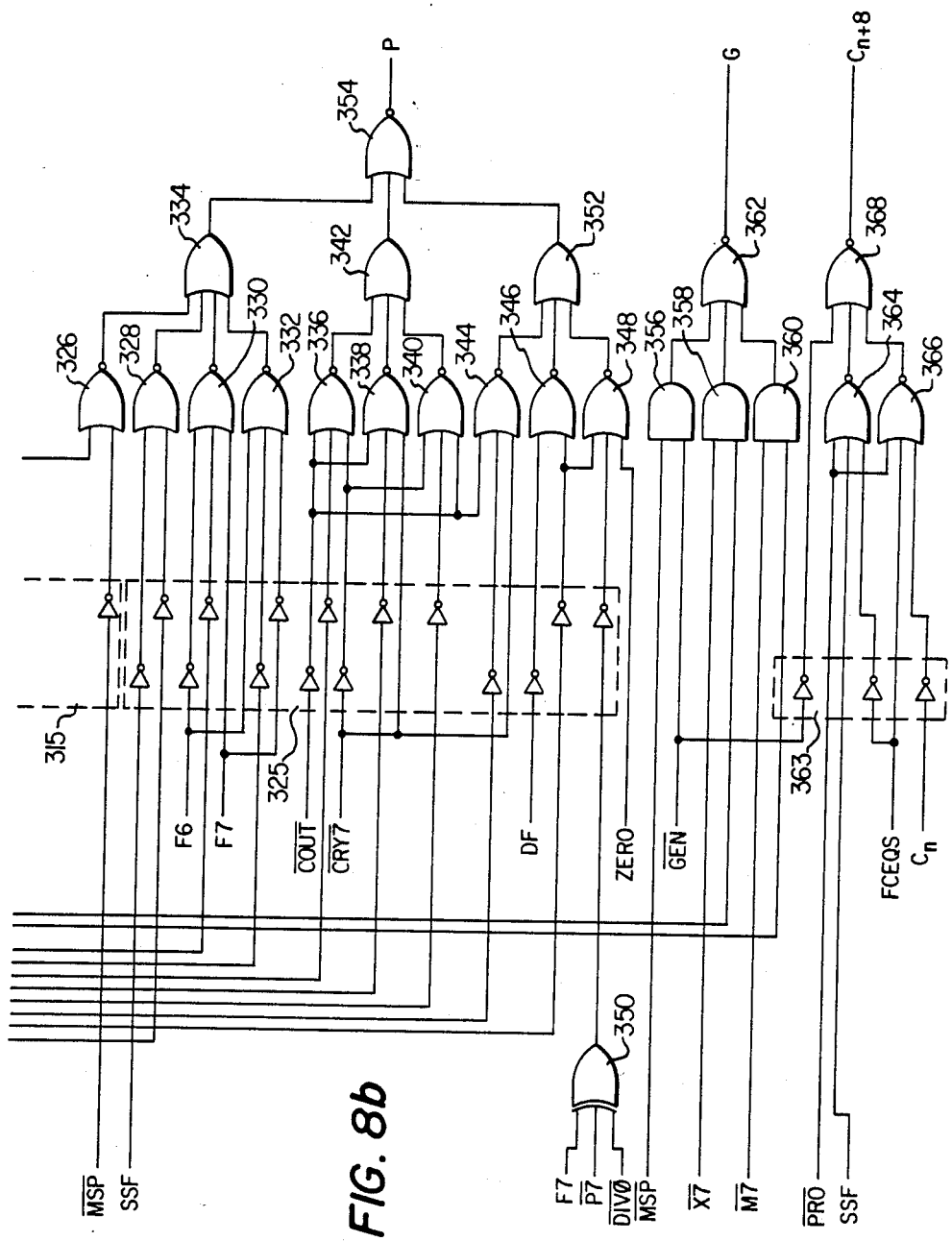

Referring now to FIG. 8, there is illustrated a schematic diagram of the logic for determining the status and control signals. The status logic circuit is generally controlled by a programmable logic array (PLA) 278 which receives on the output thereof the instructional word I0-I7 and status and control signals SSF, $\overline{SIO0}$, $\overline{BCD2}$ and $\overline{MSP}$. The PLA 278 provides a plurality of control pins to the inputs of various gates. They are labeled STZX, STZM, STZR, STZ072, STY1, STY2 and STX1-STX8. The STX lines are input through an inverter in bank of inverters 280 to the input of a three-input OR gate 282, the output of which is input to one input of three-input NOR gate 284. The other two inputs of OR gate 282 are connected to bits $\overline{X6}$ and $\overline{X7}$ of bus 64 on the output of ALU 36. A three-input OR gate 286 has a three inputs thereof connected through the inverter bank 282 the bits $\overline{X3}$-$\overline{X5}$ and the output thereof connected to one input of NOR gate 284. A three-input OR gate 288 has the inputs thereof connected to bits $\overline{X0}$-$\overline{X2}$ of bus 64 and the output thereof connected to the input of NOR gate 284. NOR gate 284 has the output thereof connect to one input of a four-input NOR gate 290.

The STZX signal from PLA 278 is connected through inverter bank 282, the input of a two-input OR NOR gate 294. NOR gate 294 has the output thereof connected to the input of NOR gate 290. Three-input NOR gates 308, 310 and 312, each having the three inputs thereof connected through inverter bank 302 to bits $\overline{M0}$-$\overline{M2}$, $\overline{M3}$-$\overline{M5}$ and $\overline{M6}$-$\overline{M7}$, respectively, with the third input of OR gate 312 being connected to the STZM output of PLA 278. The output of OR gates 308-312 are connected to respective inputs of a three-input NOR gate 314, the output of which is connected to the input to NOR gate 290.

A three-input OR gate 316 has one input thereof connected through an inverter bank 315 to the STZR output of PLA 278 and the remaining two inputs thereof connected to the bits $\overline{R6}$ and $\overline{R7}$ of bus 40 through inverter bank 315. A three-input OR gate 318 and three-input OR gate 320, each have the three inputs thereof connected through inverter bank 315 to bits $\overline{R0}$-$\overline{R2}$ and $\overline{R3}$-$\overline{R5}$, respectively, on bus 40. The output of OR gates 316-320 are connected to the input of a three-input NOR gate 322, the output of which is connected to the input of NOR gate 290.

NOR gate 290 has the output thereof connected to one input of an AND gate 324. The other input of AND gate 324 is connected to the ST070 to output of PLA 278. The output of AND gate 324 provides the ZERO status output from the bit slice ALU.

NOR gate 326 has one input thereof connected to the $\overline{PRO}$ signal through inverter bank 315 and the input thereof connected to the $\overline{MSP}$ signal which is one of the package position inputs for the most significant package. An OR gate 328 has inputs thereof connected through an inverter bank 325 through the SSF input and the other input thereof connected through bank 325 to the STX8 output of PLA 278. A three-input NOR gate 330 has one input thereof connected to the STX1 output of PLA 278 and the other two inputs thereof connected to the F6 and F7 outputs of ALU 36 on bus 59. A three-input NOR gate 332 has one input thereof connected to the STX2 output of PLA 278 and the other two inputs thereof connected to the F6 and F7 outputs on bus 59. NOR gates 326-332 each have the output thereof connected to one input of the four-input OR gate 334.

A three-input NOR gate 336 has one input thereof connected to the STX4 output of PLA 278 and the other two inputs thereof connected to the ALU carry-out signals $\overline{COUT}$ and CRY7 through inverter bank 325. A three-input NOR gate 338 has one input thereof connected to the STX4 output of PLA 278 and the other two inputs thereof connected to the ALU carry outputs $\overline{COUT}$ and $\overline{CRY7}$. A three-input ALU 340 has one input thereof connected to the STX5 output of PLA 278 and the other two inputs thereof connected to the ALU carry outputs $\overline{COUT}$ and $\overline{CRY7}$ through inverter bank 325. The outputs of NOR gates 336-340 are each connected to one input of a three-input NOR gate 342.

A three-input NOR gate 334 has one input thereof connected to the STX6 output of PLA 278 and the other two inputs thereof connected to the ALU carry outputs COUT and CRY7 through inverter bank 325. A two-input NOR gate 346 has one input thereof connected to the STX7 output of PLA 278 and the other input thereof connected to the DF output of the divide flip-flop 70. A three-input NOR gate 348 has one input thereof connected to inverter bank 325 to the STX7 output of PLA 278, one input thereof connected to a Z-input indicating a ZERO condition and the remaining input thereof connected to inverter bank 325 to the output of an exclusive OR gate 350. Exclusive OR gate 350 has three inputs connected to the F7 signal, a $\overline{P7}$ signal and a $\overline{DIV0}$ signal from the divide flip-flop 70. The outputs of NOR gate 344-348 are each connected to one input of a three-input OR gate 352. The outputs of OR gates 334-342 and 352 are each connected to one input of a NOR gate 354, the output of which comprises the propagation signal P from the output of the device.

An AND gate 356 has one input thereof connected to the $\overline{MSP}$ signal and the other input thereof connected to an internal signal $\overline{GEN}$. An AND gate 358 has one input thereof connected to the STY1 output of PLA 278 and the other input thereof connected to the STY1 output of PLA 278. An AND gate 360 has one input thereof connected to the STY 2 output of PLA 278 and the other input thereof connected to the $\overline{M7}$ input to the MQ register on bus 69. AND gates 356-360 have the inputs thereof each connected to one input of a three-input NOR gate 362, the output of which provides the "G" signal for the Propagate and Generate functions.

A three-input NOR gate 364 has one input thereof connected to the ALU output $\overline{PRO}$ and the other input thereof connected to the SSF output. A third input is connected through an inverter in a bank 363 to a signal SCEQS. A three-input NOR gate 366 has one input thereof connected to the $\overline{PRO}$ signal, on input thereof connected to the SCEQS and the other input thereof connected through the inverter bank 363 to the carry-in signal $C_n$. The outputs of NOR gates 364 and 366 are connected to two inputs of a three-input NOR gate 368, the other input of which is connected to inverter bank 363 to the $\overline{GEN}$ signal. The output of NOR gate 368 provides the $C_{n+8}$ output.

In summary, there has been provided a bit slice ALU which is cascadable and has the ability to output both status and command signals at the same time. One bi-directional output is provided for outputting information regarding the zero value of the results and an other bi-directional output is provided for outputting control information. This control information is derived by predetermined processing steps for a given function with the status of this output recognized by the remaining packages in a cascaded bit slice processor.

Although the preferred embodiment has been described in detail, it should be understood that various changes, substitutions and alterations can be made therein without departing from the spirit and scope of the invention as defined by the appended claims.

What is claimed is:

1. An expandable bit slice processor comprising:
   plurality of bit slice arithmetic logic units for processing data in accordance with one of a plurality of predetermined processing functions, each of said arithmetic logic units being n-bits in length;
   means for cascading said bit slice arithmetic logic units to provide an expanded arithmetic logic unit nXm bits in length to provide processing for an expanded length word where m is the number of said cascaded bit slice arithmetic logic units;
   first interface means for interfacing status information between said cascaded bit slice arithmetic logic units; and
   second interface means for interfacing control information between said cascaded bit slice arithmetic logic units;
   said first and second interface means operable to simultaneously interface control and status information, respectively;
   each of said bit slice arithmetic logic units having:
      status means for determining status information for the processed data in accordance with one of the predetermined processing functions by which the data is being processed and generating a status signal containing the status information;
      third interface means for interfacing said status information with said first interface means to transmit the predetermined status to all of said cascaded bit slice arithmetic logic units;
      control means for determining control information for the processed data and generating a control signal containing the control information, said control information determined in accordance with a predetermined control logic function that is a function of one of the predetermined processing functions by which the data is processed; and
      fourth interface means for interfacing the control signal with said second interface means such that the control signal is transmitted to all of the cascaded bit slice arithmetic units simultaneously with said status signal.

2. The expandable bit slice processor of claim 1 wherein said control signal and said status signal each comprises a signal having a first state and second state to provide two states of status information for said status signal and two states of control information for said control signal.

3. The expandable bit slice processor of claim 1 further comprising means coupled to said control means for determining the position of each of said bit slice arithmetic logic units in the expanded length word.

4. The expandable bit slice processor of claim 1 wherein said first interface means comprises a first common bus and said second interface means comprises a second common bus.

5. The expandable bit slice processor of claim 1 wherein said status information on said first interface means comprises information as to whether a result of the predetermined processing function has a value of zero.

6. The expandable bit slice processor of claim 1 wherein said control means comprises: p1 means for receiving an external instruction word;
   decode logic means for decoding said instruction word in accordance with a predetermined decode pattern and outputting one or more control outputs; and
   logic means for being interfaced with internal processed data associated one of said arithmetic logic units and said control output from said decode logic means and processing said control outputs and internal processed data with a predetermined logic function to output said control signal.

7. The expandable bit slice processor of claim 6 wherein said decode logic means comprises a programmable logic array.

8. The expandable bit slice processor of claim 6 wherein said control outputs provide enabling signals for said logic means to select portions of the internal processed date for processing by said predetermined logic function.

9. The expandable bit slice processor of claim 6 and further comprising means for decoding said external instruction word to select one of said processing functions utilized by said bit slice arithmetic logic units for processing data.

10. An expandable bit slice processor, comprising:
    a plurality of bit slice arithmetic logic units for processing data in accordance with one of a plurality of predetermined processing functions, each of said arithmetic logic units being n-bits in length;
    means for cascading said bit slice arithmetic logic units to provide an expanded word length nXm bits in length where m is the number of said cascaded bits slice arithmetic logic units;
    a control bus interfaced with each of said arithmetic logic units;
    a status bus interfaced with each of said arithmetic logic units;
    each of said arithmetic logic units having:
        first means for receiving an instruction word and selecting one of said predetermined processing functions;
        second means for receiving data and coupled to said first means for processing data in accordance with said selected predetermining processing functions; and
        status means for interfacing with the process data and generating status information in accordance with the selected processing function and generating a status signal for output to said status bus for interfacing with the remaining ones of said arithmetic logic units; and
        control means for interfacing with internal processed data for processing with a predetermined control logic function that is a function of said received instruction word and generating a control signal in response thereto for output to said control bus, said control signal interfaced through said control bus with the remaining ones of said arithmetic logic units.

11. The expandable bit slice processor of claim 10 wherein said control means comprises:
    decode logic means for decoding said instruction word in accordance with a predetermined decode pattern and outputting one or more control outputs; and
    logic means for being interfaced with the internal processed data and said control outputs, and processing said control outputs and internal processed data with one of a plurality of predetermined logic functions to output said control signals, said logic function selected by said control outputs.

12. The arithmetic logic unit of claim 11 wherein said decode logic means comprises a programmable logic array.

* * * * *